(12) United States Patent
Klün et al.

(10) Patent No.: US 6,308,574 B1
(45) Date of Patent: *Oct. 30, 2001

(54) MEASURING DEVICE TO MEASURE THE PRESSURE OF AN ATMOSPHERE

(75) Inventors: Wolfgang Klün, Ingolstadt; Franz Knopf, Bühl/Baden, both of (DE)

(73) Assignee: Ebro Electronic GmbH & Co. KG, Ingolstadt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,752

(22) Filed: Apr. 13, 1999

(30) Foreign Application Priority Data

Apr. 16, 1998 (DE) .................................. 198 16 872

(51) Int. Cl.⁷ .......................... G01L 7/00; G01N 7/00
(52) U.S. Cl. .............................. 73/706; 73/31.04
(58) Field of Search ..................... 73/23.27, 29.03, 73/31.04, 706; 702/136, 138

(56) References Cited

U.S. PATENT DOCUMENTS

| | | | |
|---|---|---|---|
| 4,128,006 | * 12/1978 | Grabow | 73/724 |
| 4,586,383 | * 5/1986 | Blomquist | 73/706 |
| 5,656,780 | * 8/1997 | Park | 73/724 |
| 5,665,921 | * 9/1997 | Gerst et al. | 73/715 |
| 5,774,056 | * 6/1998 | Berry, III et al. | 340/607 |

FOREIGN PATENT DOCUMENTS

| | | |
|---|---|---|
| 3732100 A1 | 4/1989 | (DE) . |
| 4031981 A1 | 4/1992 | (DE) . |
| 19608422 A1 | 9/1997 | (DE) . |
| 19637763 A1 | 3/1998 | (DE) . |
| 0736757 A1 | 10/1996 | (EP) . |

\* cited by examiner

Primary Examiner—William Oen
Assistant Examiner—Abdullahi Aw-musse
(74) Attorney, Agent, or Firm—Dority & Manning, PA

(57) ABSTRACT

A measuring device is proposed to measure the gas pressure of an atmosphere, whereby the measuring device is provided with a sensor to measure the pressure located in the interior of a housing which encloses the sensor. In addition a unit to control the measuring device and to evaluate the signals as well as a supply unit are installed in this housing. The housing itself is sealed off against the surrounding atmosphere and is provided with contacts on the housing for the exchange of data between the measuring device and a unit for the evaluation of measured values connected to it. The contacts are provided at the same time to ensure that the unit for the evaluation of the signal of the pressure sensor can be supplied with control signals from outside the housing.

18 Claims, 1 Drawing Sheet

MEASURING DEVICE TO MEASURE THE PRESSURE OF AN ATMOSPHERE

The present invention relates to a measuring device to measure the gas pressure of an atmosphere according to the introductory clause of claim 1. For the monitoring of processes, e.g. of the pressure ratios of autoclaves, it is a known method to introduce a sensor into same which is connected via a connecting circuit to a display device. The process taking place can be monitored on the display device, whereby the pressure is recorded by reading and writing it down. This process is very expensive, but no other solution is possible with the known measuring devices.

It is the object of the present invention to propose a measuring device which considerably facilitates the measuring and recording of the process. This object is attained according to the invention by the measuring device with the characteristics of claim 1.

With the measuring device according to the invention it is advantageously possible to render the measuring deice autonomous, i.e. it has its own energy supply and also operates autonomously. This makes it possible for the measuring device to be brought directly into the atmosphere to be measured and to measure and record the pressure of the atmosphere at that location. For this no cables or measuring circuits need to be transferred, since the measuring and storing of the measured values need not take place outside the atmosphere to be measured.

After a selected time period the measuring device can be taken out of the atmosphere to be monitors and the evolution of pressure of the atmosphere can be read out from the measuring device's memories of measured values. For this purpose the contacts are connected advantageously to the unit for the evaluation of the measured values, so that the data can be read from the memory. In addition the measuring device is connected via the contacts to a reading device and the measured values are read and evaluated or also documented with the help of the reading device, e.g. a computer. Contacts which are connected to the unit for control of the measuring device are especially advantageous. Thereby data can be transmitted advantageously to the measuring device and the measuring device can be controlled by means of these data. Thus points or spans of time can be determined at which the measuring device is to operate. The design of the measuring device in which the contacts are connected to the control unit as well as to the unit for the evaluation of signals produced by the sensor is especially advantageous. In that case only two contacts need to be provided on the measuring device.

The measuring device is advantageously provided with an opening in its housing through which the sensor is connected to the atmosphere. It is especially advantageous if this opening is closed off by the sensor itself from the interior space, so that the interior space of the measuring device does not come into contact with the atmosphere to be monitored. The pressure sensor is equipped to special advantage with a membrane made of a ceramic material. This membrane is suited for many media to be monitored because the ceramic material is chemically neutral and resistant, e.g. against acids and alkaline solutions or their vapors.

In another advantageous embodiment of the invention the measuring device is provided with a housing which is made at least in part of special steel. Thereby it is possible to use the measuring device also in applications where perfect hygienic conditions must be ensured, because it comes into contact with food. In addition, special steel is especially insensitive to corrosive media. The housing is advantageously made in several parts, so that the housing surface itself can provide at least two contacts. For this the elements of the housing are advantageously insulated electrically from each other. The connection between the different housing elements via a seal ensures that the media or atmosphere to be measured does not reach the interior of the housing and at the same time this can make it possible that the latter can be opened and closed again. This especially facilitates the maintenance of the measuring device. It is especially advantageous for the seal to be made of a material compatible with foodstuff so that the measuring device can also be used in areas where foodstuff is stored or processed. "Material compatible with foodstuff" is understood to mean a material which is suitable, and also authorized by the authorities, for use with foodstuff, e.g. the synthetic material "Peek".

In an especially advantageous embodiment of the measuring device the latter is provided in addition to the pressure sensor with one or several additional sensors which measure the other status parameters of the atmosphere. These may be e.g. temperature, air moisture, pH values or other status parameters. In addition the measuring device may be advantageously equipped with device for the evaluation of the signal of the pressure sensor which is able to process at the same time also the signals of other sensors. If the measuring device is furthermore equipped with a temperature sensor, this is especially advantageous because the evolution of temperature can then also be determined at the same time. This is especially useful when monitoring processes in autoclaves. In this way a sterilization process can for example be documented accurately by means of the device according to the invention. The temperature sensor is advantageously designed so that it can be uses with temperatures of 200° C. The utilization of a temperature sensor designed to be used for a temperature range from −30° C. to 140° C. is especially advantageous.

In an especially advantageous further development of the invention the evaluation unit for the evaluation of the signal is furthermore provided with a memory to store the measured values of the additional sensors. In another advantageous embodiment of the invention the measuring device is provided with a memory for the characteristic data of the pressure sensor which are assigned advantageously to the evaluation unit. This makes it possible to adjust the evaluation unit exactly to the sensor, so that precise measured values are produced and measuring errors can be kept to a minimum. An appropriate memory can also be used advantageously for additional sensors.

In an especially advantageous further development of the invention the pressure sensor is designed so that it can be used with pressures from 0 bar to 400 bar. This open a wide area of applications to the measuring device. In another especially advantageous embodiment of the measuring device it is equipped with a memory to store 100,000 and more measure values. The memory capacity is advantageously between 8,000 and 80,000 measured values. This applies to the number of measured values of the pressure sensor as well as to those of the additional sensors of the measuring device.

The invention is described below through drawings.

FIG. 1 shows a side view of the measuring device, in a section;

FIG. 2 shows an upper part of the sensor in an alternative design.

The measuring deice of FIG. 1 consists essentially of a housing 1 which is not shown by hatch marking for the sake of clarity, and of a sensor 10 on the housing 1 which is placed in a sensor housing 100. The sensor 10 consists essentially of a membrane 11 which makes it possible to measure the pressure acting upon it through the deformation of a membrane 11. Measuring elements (not shown) are provided in a known manner on the membrane 11 and these are connected via electrical circuit 110 to the unit 4 for the evaluation of the signals of the sensor 10. The membrane 11 is located in the sensor housing 100 and bears with its edge on a ring-shaped edge 102. The membrane 11 is held by the upper part 103 of the sensor housing 100. For this the seals 104 are provided between the membrane 11, the sensor housing 100 and the upper part 103. The upper part 103 fixes the membrane in the sensor housing 100. The upper part 103 is screwed on the sensor housing 100 by means of threads 105. The upper part 103 is provided with a bore 106 through which the pressure of the surrounding atmosphere is transmitted to the membrane 11. The membrane 11 is in form of a disk on the contours of which the interior of the sensor housing 100 is oriented.

The upper part 103 and the sensor housing 100 are preferably made of special steel which is not only very corrosion resistant, but can also be used in interaction with food.

The sensor housing 100 is sitting on a protrusion 19 of the outside of housing 1 of the measuring device and is attached to it by means of a ring shaped welding seam 3. The sensor housing 100 extends with a tubular section 31 through a bore 32 of the housing 1 into the interior of the housing. The electrical lines 110 of the sensor 10 also run through the tubular section 31. The housing 1 is provided with the bore 32 to receive the tubular section 31.

The housing 1 of the measuring device 9 consists of two halves, of which one housing half 91 supports the sensor housing 100, while the housing half 92 away from the sensor housing 100 is symmetrical relative to the housing half 91. It has no seat or bore. Both housing halves 91 and 92 are connected to each other via a housing seal 93. The housing seal 93 has two threads 94, whereby it interacts with one set of threads with the housing half 91 and with the other correspondingly with the housing half 92 away from the sensor housing 100.

The housing seal 93 is made of a synthetic material which is compatible with foodstuff and is known by the name "Peek". The two housing halves 91 and 92 are firmly connected to each other by the seal, and the interior 30 of the housing 1 of the measuring device 9 is hermetically sealed off from its surroundings. In the interior of the housing 1 of the measuring device 9 all the components needed for its operation are located. Thus the measuring device 9 is provided in its interior with a part 4 to control the measuring device and to evaluate the signal produced by the sensor. The unit 4 is connected via energy supply lines 40 to the supply unit 20 for the supply of the measuring device with energy. The unit 4 for the evaluation of the signal and to control the measuring device is furthermore connected to the memories 41 which serve to store the signals and measuring data obtained by the unit 4. The data can be taken directly or preferably via unit 4 from the memories 41 to control the measuring device at the given time, so that they may be transmitted to an external evaluation unit. This transmission takes place via unit 4 for the evaluation of the signal and for the control of the measuring device. For this the unit 4 can be contacted via electrical contacts from outside the housing 1. In the present example of a measuring device the contacts through which the unit 4 can be actuated to control the measuring device from the outside consist of the two housing halves 91 and 92. The two housing halves 91 and 92 are connected via electrical lines 910 and 920 to the unit 4. The two housing halves 910 and 920 are connected mechanically via the housing seal 93 but are electrically insulated. Therefore the measuring device 9 requires no additional electrical contacts in order to be actuated externally for control. To read the measured data from the memories 41 of the measuring device 9, the latter is placed in a suitable receptacle (not shown) where its two housing halves 91 and 92 are connected to electrical contacts of this receptacle. The receptacle is part of a device for the reading of the data. The latter may be a computer, for example, using a suitable program for data processing.

The unit 4 for the evaluation of the signal and for the control of the measuring device is connected via contacts 2 to the housing halves 91 and 92 e.g. to a reading device not only for the transmission of data, but also in order to receive control information from outside and to store it then in the memories 41 and to use them in operation. The measuring device can thus be reprogrammed when necessary, without requiring a direct intervention in the device. In addition to storing the measured values obtained by the measuring device, the memories 41 are also used to store control information, and furthermore the memories also contain correction values if necessary for the measured signals delivered by the sensor. Thereby the unit 4 is coordinated individually with the membrane used. This enables the measuring device to produce especially precise measured values.

A long-life battery is used as the supply unit 20, so that the measuring device can be supplied with energy over a very long time. This is understood to mean time periods of up to several years. At the end of the battery life of the supply unit, the two housing halves 91 and 92 can be separated from each other. To do this, the screw connection with the housing seal 93 is opened by rotating the housing halves in opposite directions. This makes it possible to simply replace an empty battery with a full one.

In addition to the pressure sensor 10, the measuring device is also equipped with an additional sensor 8. The latter is a temperature sensor and therefore serves to measure the temperature of the atmosphere surrounding the measuring device. The temperature sensor is connected to the unit 4 via the line 81. The unit 4 also evaluates its signal and stores it if necessary also in the memory 41 from which the measured temperature values can be read. To measure the temperature, the temperature sensor is connected either to the wall of the housing or measures the temperature inside the housing 1. It adapts itself very quickly to the environmental temperature, so that this is usually sufficient. If the additional sensor requires contact with the atmosphere to be measured, e.g. a sensor to measure moisture, an opening must of course be provided in the housing 1.

The housing 1 as well as the sensor 10 are rotation-symmetrical components so that the a top view of the representation of FIG. 1 is not required to understand the invention.

FIG. 2 shows a upper part 103 of the sensor housing 100 of the measuring device 9, whereby this upper part is configured so that a tube or hose can be attached in its bore 500 via the threads 600 located in the bore 500. The application possibilities of the measuring device can be expanded considerably by means of such an extension piece, because the pressure can thereby be measured at a different location and the measuring device can also be installed outside an atmosphere to be monitored. In all other respects the upper part of FIG. 2 is attached to the sensor 10 in exactly the same manner as shown in FIG. 1. The membrane is held in an elastic manner over the ring-shaped seal 104, especially since it also lies on an elastic seal 104 in the sensor housing 100 (see FIG. 1). The interior of the housing 1 is thereby also hermetically sealed off from the atmosphere surrounding the measuring device 9 via membrane 11 in combination with the seal 104. The seals 104 have inclined sealing surfaces (see FIG. 2) for better insulation from an atmosphere containing vapor. The inclination of the sealing surfaces is produced due to the fact that the height (axial extension) on the inside diameter of the seal is less than its height on the outside diameter.

The membrane 11 consists of a ceramic material which is not only especially well suited for the present device of the invention for reasons of measuring technology, but also thanks of its other favorable material characteristics. Thus, ceramic is especially insensitive to acids and alkaline solutions and is furthermore compatible with foodstuff. The seals 10 interacting with the membrane 11 are also made of a material that is compatible with foodstuff, e.g. "Peek".

In addition to the embodiment shown in FIG. 1, the measuring device according tot he invention can also be equipped with a sensor which is located in a sensor housing located inside the housing of the measuring device. The arrangement depends essentially on the spacial conditions inside the housing. Furthermore the utilization of additional sensors is not limited only to one additional sensor, but depending on what is required, several additional sensors can be integrated into the measuring device.

What is claimed is:

1. A measuring device to measure the gas pressure of an atmosphere, said measuring device comprising:
   a housing enclosing an interior space sealed off from the surrounding atmosphere;
   a sensor configured integral with said housing to measure the pressure;
   an evaluation unit disposed within said interior space of said housing in communication with said sensor for evaluation of a signal from said sensor;
   a memory disposed within said interior space of said housing in communication with said evaluation unit for storage of measured values from said evaluation unit and for supplying stored data to said evaluation unit; and
   a power supply unit contained within said interior space of said housing electrically connected to said evaluation unit for supplying power to said measuring device.

2. A measuring device as in claim 1, further comprising at least one contact integral to said housing for transmitting information from said evaluation unit to an external data manipulation device and receiving information from said external data manipulation device for control of said measuring device.

3. A measuring device as in claim 1, wherein said sensor further comprises a sensor housing having an opening through which said sensor is in contact with the surrounding atmosphere.

4. A measuring device as in claim 3, wherein said sensor housing is mounded on said housing and is in communication with said interior space, said interior space is sealed off by said sensor.

5. A measuring device as in claim 1, wherein the sensor contains a membrane to measure the pressure of said atmosphere.

6. A measuring device as in claim 5, wherein said membrane is composed of a ceramic material.

7. A measuring device as in claim 1, wherein said housing is made of a special corrosive resistant steel.

8. A measuring device as in claim 7, wherein said housing is constructed of two steel halves electrically insulated from each other in a manner which is water and vapor proof.

9. A measuring device as in claim 8, wherein said housing halves are connected by a seal which is compatible with foodstuff.

10. A measuring device as in claim 1, further comprising at least one additional sensor to measure other parameters of the atmosphere and said evaluation unit evaluates the signals from said additional sensor.

11. A measuring device as in claim 10, wherein a temperature sensor is employed to monitor the temperature of the atmosphere surrounding said measuring device.

12. A measuring device as in claim 11, wherein said temperature sensor monitors the temperature of the surrounding atmosphere from within said housing.

13. A measuring device as in claim 12, wherein said temperature sensor is designed for utilization in temperatures ranging up to 200° C.

14. A measuring device as in claim 12, wherein said temperature sensor is designed for utilization in temperatures ranging from −30° C. to 140° C.

15. A measuring device as in claim 1, wherein a seal is utilized in said sensors and housing, said seal containing a sealing surface inclined relative to the surface to be sealed off.

16. A measuring device as in claim 1, wherein said power supply unit is a battery.

17. A measuring device as in claim 1, wherein said memory has a storage capacity for at least as many measured values as are recorded in an operating period of 3 days.

18. A measuring device as in claim 1, wherein said memory has a storage capacity of 8,000 to 80,000 measured values.

* * * * *

UNITED STATES PATENT AND TRADEMARK OFFICE
CERTIFICATE OF CORRECTION

PATENT NO.     : 6,308,574 B1
DATED          : October 30, 2001
INVENTOR(S)    : Klun et al.

It is certified that error appears in the above-identified patent and that said Letters Patent is hereby corrected as shown below:

The title page, showing an illustrative figure, should be deleted and substitute therefore the attached title page.

Columns 1-6, should be deleted and substitute therefore columns 1-8, as shown in the attached pages.

Signed and Sealed this

Third Day of February, 2004

JON W. DUDAS
*Acting Director of the United States Patent and Trademark Office*

(12) United States Patent
Klün et al.

(10) Patent No.: US 6,308,574 B1
(45) Date of Patent: *Oct. 30, 2001

(54) MEASURING DEVICE TO MEASURE THE PRESSURE OF AN ATMOSPHERE

(75) Inventors: Wolfgang Klün, Ingolstadt; Franz Knopf, Bühl/Baden, both of (DE)

(73) Assignee: Ebro Electronic GmbH & Co. KG, Ingolstadt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,752

(22) Filed: Apr. 13, 1999

(30) Foreign Application Priority Data

Apr. 16, 1998 (DE) .......................................... 198 16 872

(51) Int. Cl.⁷ .............................. G01L 7/00; G01N 7/00
(52) U.S. Cl. ................................... 73/706; 73/31.04
(58) Field of Search ............................ 73/23.27, 29.03, 73/31.04, 706; 702/136, 138

(56) References Cited

U.S. PATENT DOCUMENTS

| | | | |
|---|---|---|---|
| 4,128,006 | * 12/1978 | Grabow | 73/724 |
| 4,586,383 | * 5/1986 | Blomquist | 73/706 |
| 5,656,780 | * 8/1997 | Park | 73/724 |
| 5,665,921 | * 9/1997 | Gerst et al. | 73/715 |
| 5,774,056 | * 6/1998 | Berry, III et al. | 340/607 |

FOREIGN PATENT DOCUMENTS

| | | |
|---|---|---|
| 3732100 A1 | 4/1989 | (DE) . |
| 4031981 A1 | 4/1992 | (DE) . |
| 19608422 A1 | 9/1997 | (DE) . |
| 0736757 A1 | 10/1996 | (EP) . |

* cited by examiner

*Primary Examiner*—William Oen
*Assistant Examiner*—Abdullahi Aw-Musse
(74) *Attorney, Agent, or Firm*—Dority & Manning, PA

(57) ABSTRACT

A measuring device is proposed to measure the gas pressure of an atmosphere, whereby the measuring device is provided with a sensor to measure the pressure located in the interior of a housing which encloses the sensor. In addition a unit to control the measuring device and to evaluate the signals as well as a supply unit are installed in this housing. The housing itself is sealed of f against the surrounding atmosphere and is provided with contacts on the housing for the exchange of data between the measuring device and an external receptacle. The contacts are provided at the same time to ensure that the unit for the evaluation of the signal of the pressure sensor can be supplied with control signals from outside the housing.

21 Claims, 1 Drawing Sheet

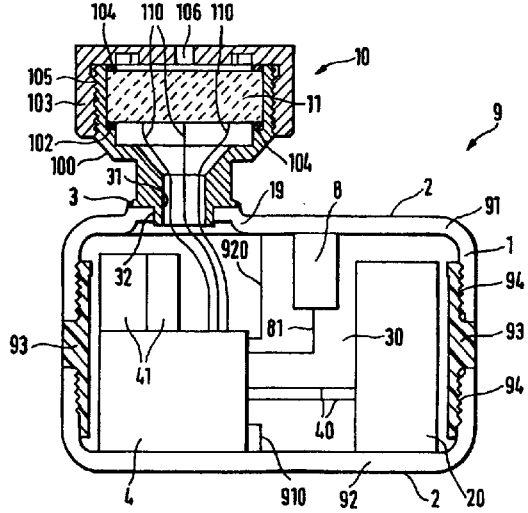

MEASURING DEVICE TO MEASURE THE PRESSURE OF AN ATMOSPHERE

BACKGROUND OF THE INVENTION

The present invention relates to a measuring device to measure the gas pressure of an atmosphere comprising a sensor to measure the pressure and a housing enclosing an interior space in which a unit to control the measuring device and to evaluate the signal produced by the sensor and a supply unit to supply the measuring device with energy is located. For the monitoring of processes, e.g., of the pressure ratios of autoclaves, it is a known method to introduce a sensor into autoclaves which is connected via a connecting circuit to a display device. The process taking place can be monitored on the display device, whereby the pressure is recorded by reading and writing it down. This process is very expensive, but no other solution is possible with the known measuring devices.

OBJECT AND SUMMARY OF THE INVENTION

It is a principal object of the present invention to propose a measuring device which considerably facilitates the measuring and recording of the process. This object is attained according to the invention by the housing of the measuring device is sealed off from the surrounding atmosphere. Contacts are provided on the housing for data exchange with the measuring device and the unit for the evaluation of the signal of the pressure sensor is provided with the memories to store the measured values.

Additional objects and advantages of the invention will be set forth in part in the following description or may be obvious from the description, or may be learned through practice of the invention.

With the measuring device according to the invention, it is advantageously possible to render the measuring device autonomous, i.e., it has its own energy supply and also operates autonomously. This autonomy makes it possible for the measuring device to be brought directly into the atmosphere to be measured and to measure and record the pressure of the atmosphere at that location. For this purpose, no cables or measuring circuits need to be transferred, since the measuring and storing of the measured values need not take place outside the atmosphere to be measured.

After a selected time period the measuring device can be taken out of the atmosphere to be monitored, and the evolution of pressure of the atmosphere can be read out from the measuring device's memories of measured values. For this purpose the contacts are connected advantageously to the unit for the evaluation of the measured values, so that the data can be read from the memory. In addition, the measuring device is connected via the contacts to a reading device. The measured values are read and evaluated or also documented with the help of the reading device, e.g., a computer. Contacts which are connected to the unit for control of the measuring device are especially advantageous. Thereby, data can be transmitted advantageously to the measuring device and the measuring device can be controlled by means of these data. Thus, points or spans of time can be determined at which the measuring device is to operate. The design of the measuring device in which the contacts are connected to the control unit as well as to the unit for the evaluation of signals produced by the sensor is advantageous. In that case, only two contacts need to be provided on the measuring device.

In a preferred embodiment, the measuring device is advantageously provided with an opening in its housing through which the sensor is connected to the atmosphere. It is desirable if this opening is closed off by the sensor itself from the interior space, so that the interior space of the measuring device does not come into contact with the atmosphere to be monitored. The pressure sensor is equipped with a membrane made of a ceramic material. This membrane is suited for many media to be monitored, because the ceramic material is chemically neutral and resistant, e.g., against acids and alkaline solutions or their vapors.

In another advantageous embodiment of the invention, the measuring device is provided with a housing which is made, at least in part, of special steel. Thereby, it is possible to use the measuring device also in applications where perfect hygienic conditions must be ensured, because it comes into contact with food. In addition, special steel is especially insensitive to corrosive media. The housing is advantageously made in several parts, so that the housing surface itself can provide at least two contacts. For this purpose, the elements of the housing are advantageously insulated electrically from each other. The connection between the different housing elements via a seal ensures that the media or atmosphere to be measured does not reach the interior of the housing, and at the same time, this can make it possible that the housing can be opened and closed again. The ability to open and close the housing facilitates the maintenance of the measuring device. It is desirable for the seal to be made of a material compatible with foodstuff, so that the measuring device can also be used in areas where foodstuff is stored or processed. "Material compatible with foodstuff" is understood to mean a material which is suitable, and also authorized by the authorities, for use with foodstuff, e.g., the synthetic material "Peek".

In an especially advantageous embodiment of the present invention, the measuring device is provided, in addition to the pressure sensor, with one or several additional sensors that measure the other status parameters of the atmosphere. These parameters may be, for example, temperature, air moisture, or pH values. In addition, the measuring device may be advantageously equipped with a device for the evaluation of the signal of the pressure sensor, which is able to process at the same time the signals of other sensors. If the measuring device is furthermore equipped with a temperature sensor, this is advantageous because the evolution of temperature can then also be determined at the same time. This is especially useful when monitoring processes in autoclaves. In this way, a sterilization process can, for example, be documented accurately by means of the device according to the invention. The temperature sensor is advantageously designed so that it can be uses with temperatures of 200° C. The utilization of a temperature sensor designed to be used for a temperature range from −30° C. to 140° C. is desirable.

In a further development of the invention, the evaluation unit for the evaluation of the signal is furthermore provided with a memory to store the measured values of the additional sensors. In another advantageous embodiment of the invention, the measuring device is provided with a memory for the characteristic data of the pressure sensor which are assigned advantageously to the evaluation unit. This makes it possible to adjust the evaluation unit exactly to the sensor, so that precise measured values are produced and measuring errors can be kept to a minimum. An appropriate memory can also be used advantageously for additional sensors.

In a preferred embodiment of the invention, the pressure sensor is designed so that it can be used with pressures from 0 bar to 400 bar. This opens a wide area of applications to the measuring device. In another advantageous embodiment of the measuring device, it is equipped with a memory to store 100,000 and more measured values. The memory capacity is advantageously between 8,000 and 80,000 measured values. This applies to the number of measured values of the pressure sensor, as well as to those of the additional sensors of the measuring device.

The invention is described below through drawings.

DETAILED DESCRIPTION

Figure 1:
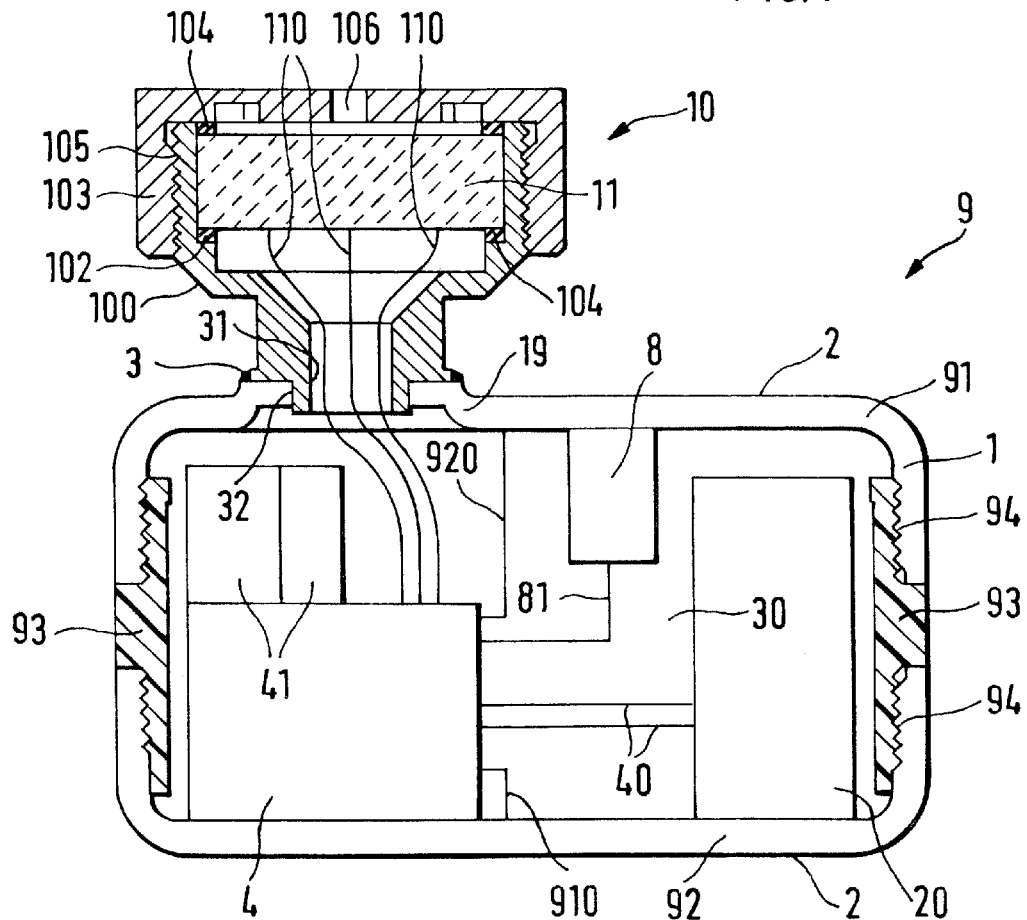
FIG. 1. shows a side view of the measuring device, in a section.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

The measuring device of FIG. 1 consists essentially of a housing 1, which is not shown by hatch marking for the sake of clarity, and a sensor 10 on the housing 1 which is placed in a sensor housing 100. The sensor 10 consists essentially of a membrane 11 which makes it possible to measure the pressure acting upon it through the deformation of membrane 11. Measuring elements (not shown) are provided in a known manner on the membrane 11 and these are connected via electrical circuit 110 to the unit 4 for the evaluation of the signals of the sensor 10.

The membrane 11 is located in the sensor housing 100 and bears with its edge on a ring—shaped edge 102. The membrane 11 is held by the upper part 103 of the sensor housing 100. For this the seals 104 are provided between the membrane 11, the sensor housing 100 and the upper part 103. The upper part 103 fixes the membrane in the sensor housing 100. The upper part 103 is screwed on the sensor housing 100 by means of threads 105. The upper part 103 is provided with a bore 106 through which the pressure of the surrounding atmosphere is transmitted to the membrane 11. The membrane 13, is in the form of a disk on the contours of which the interior of the sensor housing 100 is oriented.

The upper part 103 and the sensor housing 100 are preferably made of special steel which is not only very corrosion resistant, but can also be used in interaction with food.

The sensor housing 100 is sitting on a protrusion 19 of the outside of housing 1 of the measuring device, and is attached to it by means of a ring shaped welding seam 3. The sensor housing 100 extends with a tubular section 31 through a bore 32 of the housing 1 into the interior of the housing. The electrical lines 110 of the sensor 10 also run through the tubular section 21. The housing 1 is provided with the bore 32 to receive the tubular section 31.

The housing 1 of the measuring device 9 consists of two halves, of which one housing half 91 supports the sensor housing 100, while the housing half 92 away from the sensor housing 100 is symmetrical relative to the housing half 91. It has no seat or bore. Both housing halves 91 and 92 are connected to each other via a housing seal 93. The housing seal 93 has two threads 94, whereby it interacts with one set of threads with the housing half 91 and with the other set correspondingly with the housing half 92 away from the sensor housing 100.

The housing seal 93 is made of a synthetic material which is compatible with foodstuff and is known by the name "Peek". The two housing halves 91 and 92 are firmly connected to each other by the seal, and the interior 30 of the housing 1 of the measuring device 9 is hermetically sealed of f from its surroundings. In the interior of the housing 1 of the measuring device 9, all the components needed for its operation are located. Thus, the measuring device 9 is provided in its interior with a unit 4 to control the measuring device and to evaluate the signal produced by the sensor. The unit 4 is connected via energy supply lines 40 to a supply unit 20 to supply the measuring device with energy. The unit 4 used for the evaluation of the signal and to control the measuring device is furthermore connected to memories 41, which serve to store the signals and measuring data obtained by the unit 4. The data can be taken directly, or preferably via unit 4, from the memories 41 to control the measuring device at the given time, so that they may be transmitted to an external evaluation unit. This transmission takes place via unit 4 for the evaluation of the signal and for the control of the measuring device. For this, the unit 4 can be contacted via electrical contacts from outside the housing 1. In the present example of a measuring device, the contacts through which the unit 4 can be actuated to control the measuring device from the outside consist of the two housing halves 91 and 92. The two housing halves 91 and 92 are connected via electrical lines 910 and 920 to the unit 4. The two housing halves 91 and 92 are connected mechanically via the housing seal 93 but are electrically insulated. Therefore, the measuring device 9 requires nd additional electrical contacts in order to be actuated externally for control. To read the measured data from the memories 41 of the measuring device 9, the latter is placed in a suitable receptacle (not shown), where its two housing halves 91 and 92 are connected to electrical contacts of this receptacle. The receptacle is part of a device for the reading of the data. This device for reading data may be a computer using a suitable program for data processing, for example.

The unit 4 for the evaluation of the signal and for the control of the measuring device is connected via contacts 2 to the housing halves 91 and 92, e.g., to a reading device not only for the transmission of data, but also to receive control information from outside, store it in the memories 41 and use the data in operation. The measuring device can thus be reprogrammed when necessary without requiring a direct intervention in the device. In addition to storing the measured values obtained by the measuring device, the memories 41 are also used to store control information. Furthermore, the memories also contain correction values if necessary for the measured signals delivered by the sensor. Thereby, the unit 4 is coordinated individually with the membrane used. This enables the measuring device to produce especially precise measured values.

In a preferred embodiment, a long—life battery is used as the supply unit 20, so that the measuring device can be supplied with energy over a very long time. This is understood to mean time periods of up to several years. At the end of the battery life of the supply unit, the two housing halves 91 and 92 can be separated from each other. To do this, the screw connection with the housing seal 93 is opened by rotating the housing halves in opposite directions. This makes it possible to simply replace a dead battery with a new one.

In addition to the pressure sensor 10, the measuring device is also equipped with an additional sensor 8. The latter is a temperature sensor and serves to measure the temperature of the atmosphere surrounding the measuring device. The temperature sensor is connected to the unit 4 via the line 81, the unit 4 also evaluates its signal and stores it if necessary in the memory 41 from which the measured temperature values can be read. To measure the temperature, the temperature sensor is connected either to the wall of the housing or measures the temperature inside the housing 1. It adapts itself very quickly to the environmental temperature, so that this is usually sufficient. If the additional sensor requires contact with the atmosphere to be measured, e.g., a sensor to measure moisture, an opening must of course be provided in the housing 1.

The housing 1, as well as the sensor 10, are rotation—symmetrical components so that a top view of the representation of FIG. 1 is not required to understand the invention.

Figure 2:
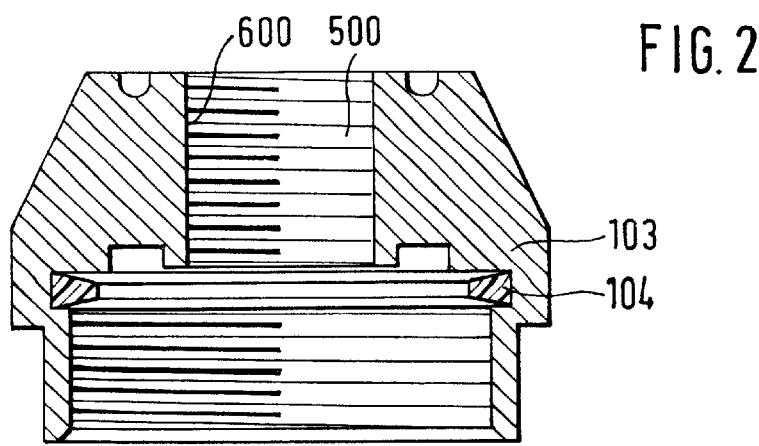
FIG. 2 shows an upper part of the sensor in an alternative design.
Figure 1:
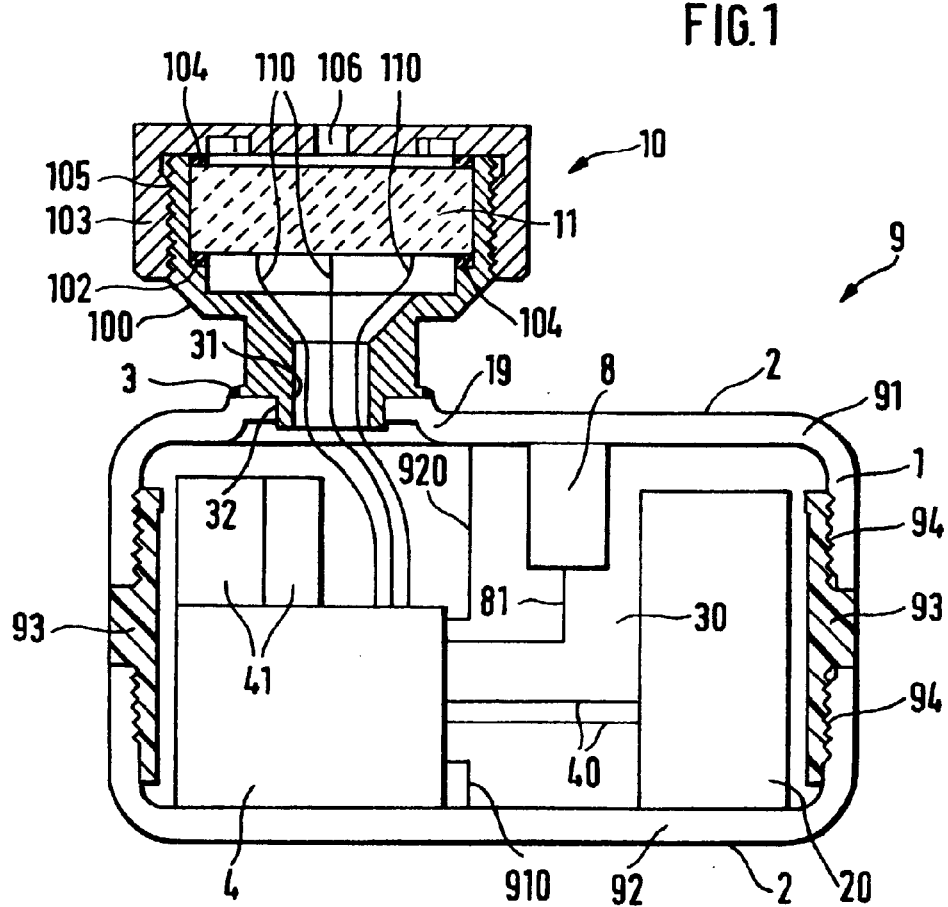
Figure 2:
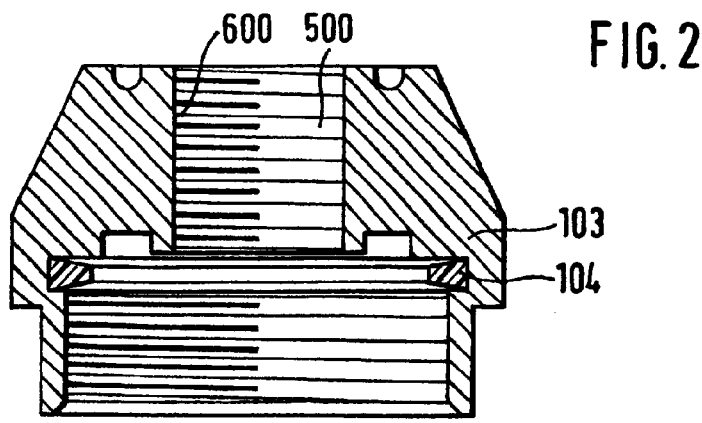

FIG. 2 shows an upper part 103 of the sensor housing 100 of the measuring device 9, whereby this upper part is configured so that a tube or hose can be attached in its bore 500 via the threads 600 located in the bore 500. The application possibilities of the measuring device can be expanded considerably by means of such an extension piece, because the pressure can thereby be measured at a different location. Also, the measuring device can also be installed outside an atmosphere to be monitored. In all other respects, the upper part of FIG. 2 is attached to the sensor 10 in exactly the same manner as shown in FIG. 1. The membrane is held in an elastic manner by the ring-shaped seal 104, especially since it also lies on an elastic seal 104 in the sensor housing 100 (see FIG. 1). The interior of the housing 1 is thereby hermetically sealed off from the atmosphere surrounding the measuring device 9 via membrane 11 in combination with the seal 104. The seals 104 have inclined sealing surfaces (see FIG. 2) for better insulation from an atmosphere containing vapor. The inclination of the sealing surfaces is produced due to the fact that the height (axial extension) on the inside diameter of the seal is less than its height on the outside diameter.

In another advantageous embodiment, the membrane 11 consists of a ceramic material which is not only especially well suited for the present device of the invention for reasons of measuring technology, but also has other favorable material characteristics. For example, ceramic is especially insensitive to acids and alkaline solutions and is furthermore compatible with foodstuff. The seals 104 interacting with the membrane II are also made of a material that is compatible with foodstuff, e.g., "Peek".

In addition to the embodiment shown in FIG. 1, the measuring device according to the invention can also be equipped with a sensor which is located in a sensor housing located inside the housing of the measuring device. The arrangement depends on the spacial conditions inside the housing. Furthermore, the utilization of additional sensors is not limited only to one additional sensor, but depending on what is required, several additional sensors can be integrated into the measuring device.

It will be appreciated by those skilled in the art that various modifications and variations can be made in the present invention without departing from the scope of the invention. It is intended that the present invention include such modifications and variations as come within the scope of the appended claims and their equivalents.

What is claimed is:

1. A measuring device to measure the gas pressure of an atmosphere, said measuring device comprising:

a housing enclosing an interior space sealed off from the surrounding atmosphere, said housing defining a first portion and a second portion, the first and the second portions defining an electrically insulating seal therebetween;

a sensor connected with said housing to measure the pressure;

an evaluation unit disposed within said interior space of said housing in communication with said sensor for evaluation of a signal from said sensor;

a memory disposed within said interior space of said housing in communication with said evaluation unit for storage of measured values from said evaluation unit and for supplying stored data to said evaluation unit; and a power supply unit contained within said interior space of said housing electrically connected to said evaluation unit for supplying power to said measuring device.

2. A measuring device as in claim 1, further comprising at least one contact defined by an exterior of said housing for transmitting information from said evaluation unit to an external data manipulation device and receiving information from said external data manipulation device for control of said measuring device.

3. A measuring device as in claim 1, wherein said sensor further comprises a sensor housing having an opening through which said sensor is in contact with the surrounding atmosphere.

4. A measuring device as in claim 3, wherein said sensor housing is mounted on said housing and is in communication with said interior space, said interior space is sealed off by said sensor.

5. A measuring device as in claim 1, wherein the sensor contains a membrane to measure the pressure of said atmosphere.

6. A measuring device as in claim 5, wherein said membrane is composed of a ceramic material.

7. A measuring device as in claim 1, wherein said housing is made of a special corrosive resistant steel.

8. A measuring device as in claim 1, further comprising at least one additional sensor to measure other parameters of the atmosphere and said evaluation unit evaluates the signals from said additional sensor.

9. A measuring device as in claim 8, wherein a temperature sensor is employed to monitor the temperature of the atmosphere surrounding said measuring device.

10. A measuring device as in claim 9, wherein said temperature sensor monitors the temperature of the surrounding atmosphere from within said housing.

11. A measuring device as in claim 10, wherein said temperature sensor is designed for utilization in temperatures ranging up to 200° C.

12. A measuring device as in claim 10, wherein said temperature sensor is designed for utilization in temperatures ranging from −30° C. to 140° C.

13. A measuring device as in claim 1, wherein a seal is utilized in said sensors and housing, said seal containing a sealing surface inclined relative to the surface to be sealed off.

14. A measuring device as in claim 1, wherein said power supply unit is a battery.

15. A measuring device as in claim 1, wherein said memory has a storage capacity for at least as many measured values as are recorded in an operating period of 3 days.

16. A measuring device as in claim 1, wherein said memory has a storage capacity of 8,000 to 80,000 measured values.

17. The measuring device as in claim 1 wherein the first housing portion and the second housing portion are substantially symmetrical.

18. The measuring device as in claim 1 wherein the first housing portion is connected via a first electrical line to said evaluation unit.

19. The measuring device as in claim 18 wherein the second housing portion is connected via a second electrical line to said evaluation unit.

20. The measuring device as in claim 18 wherein said first portion of the housing and said second portion of the housing each define a respective first contact surface and a second contact surface for the transmission of signals to and from the evaluation unit.

21. A measuring device to measure the gas pressure of an atmosphere, said measuring device comprising:

a housing enclosing an interior space sealed off from the surrounding atmosphere, said housing defining a first portion and a second portion, the first and the second portions are substantially symmetrical and define an electrically insulating seal therebetween, said first portion of the housing and said second portion of the housing each defining a respective first contact surface and a second contact surface for the transmission of signals to and from the evaluation unit;

a sensor connected with said housing to measure the pressure;

an evaluation unit disposed within said interior space of said housing in communication with said sensor for evaluation of a signal from said sensor;

at least one contact defined by an exterior surface of said housing for transmitting information from said evaluation unit to an external data manipulation device and receiving information from said external data manipulation device for control of said measuring device;

an electrical connection in communication between the first housing portion and said evaluation unit;

a memory disposed within said interior space of said housing in communication with said evaluation unit for storage of measured values from said evaluation unit and for supplying stored data to said evaluation unit; and a power supply unit contained within said interior space of said housing electrically connected to said evaluation unit for supplying power to said measuring device.

* * * * *

UNITED STATES PATENT AND TRADEMARK OFFICE
CERTIFICATE OF CORRECTION

PATENT NO. : 6,308,574 B1
DATED : October 30, 2001
INVENTOR(S) : Wolfgang Klun

It is certified that error appears in the above-identified patent and that said Letters Patent is hereby corrected as shown below:

Title page,
Item [57] ABSTRACT,
Line 5, replace "of f against" with -- off against --.

Column 2,
Line 50, after "be" replace "uses" with -- used --.

Column 3,
Line 47, after "13" delete ",".

Column 4,
Line 10, replace "of f from" with -- off from --.
Line 34, after "requires" replace "nd" with -- no --.

Column 5,
Line 48, after "membrane" replace "II" with -- 11 --.

Signed and Sealed this

Twenty-sixth Day of July, 2005

JON W. DUDAS
*Director of the United States Patent and Trademark Office*